United States Patent [19]

Leach

[11] 4,212,385
[45] Jul. 15, 1980

[54] ARTICLE ACCUMULATION CONVEYOR

[76] Inventor: John M. Leach, Box 341, Port Jefferson, N.Y. 11777

[21] Appl. No.: 946,860

[22] Filed: Sep. 29, 1978

[51] Int. Cl.² .............................................. B65G 13/06
[52] U.S. Cl. ...................................... 198/781; 198/789
[58] Field of Search ............... 198/781, 782, 783, 460, 198/789

[56] References Cited

U.S. PATENT DOCUMENTS

| 4,042,101 | 8/1977 | Krammer | 198/781 X |
| 4,121,709 | 10/1978 | Gebhardt | 198/781 |

Primary Examiner—Robert B. Reeves
Assistant Examiner—Douglas D. Watts

[57] ABSTRACT

The present invention relates to an article accumulation conveyor in which the drive for moving the articles is automatically discontinued for a selected section of the conveyor when an article is stopped for any reason on another certain section of the conveyor and is started again automatically when the article moves for any reason. The power for activating and deactivating the drive for moving the articles is furnished substantially in its entirety by the conveyor drive so that all need for extraneous power sporces or the force exerted by a moving article is entirely eliminated.

10 Claims, 5 Drawing Figures

ARTICLE ACCUMULATION CONVEYOR

BACKGROUND OF THE INVENTION

In the accumulation conveyor field it has long been desired to have a unit which can handle large, heavy articles and small, light articles on the same unit without interference and jamming between the various articles.

In prior accumulation conveyors where the force required to discontinue the conveyor drive when an article was stopped on the unit and to start the drive when the stopped article again moved has been provided by a sensor operated either by the weight or the movement of the article or both, troubles have arisen.

This is because small, light articles could not operate a clutch or the like of sufficiently heavy duty for the conveyance of heavy articles so that light and heavy articles could not be mixed on the same conveyor unless some extraneous power source such as compressed air or electricity was resorted to which required complicated mechanism, was expensive, required additional space and much maintenance. An example of a unit is disclosed by U.S. Pat. No. 3,225,893.

Efforts have been made to produce accumulation conveyors in which the power required to operate the clutch mechanisms to discontinue and then continue the movement of the conveyed articles is provided by the main conveyor drive, but such equipment to date has been complicated, expensive, and required frequent adjustments and general maintenance.

Examples of such prior art units are U.S. Pat. Nos. 3,219,172; 3,285,391; 3,156,345; 3,116,823; 3,164,246; 3,206,008, 4,108,303 and 3,232,415.

SUMMARY OF THE INVENTION

It is an object of the present invention to provide an article accumulation conveyor in which light and/or small and heavy and/or large articles can be intermixed at will on the conveyor without any untoward results and conveyed with full dexterity and freedom from trouble, expense and unusual maintenance.

It is a further object of the present invention to provide an article accumulation conveyor in which the power required to discontinue the movement of the conveyed articles is supplied by the main conveyor drive so that any very small object capable of being carried by the conveyor can easily operate the motion control mechanism.

It is a further object of the present invention to provide a power take-off from the main conveyor drive to supply the power required to operate the motion control mechanism which is simple, dependable, inexpensive, and adds very few additional parts to the basic conveyor structure.

It is also an object of the present invention to provide an accumulation conveyor which can by a single control be instantly converted to either a power driven roller conveyor or a simple free roller conveyor.

Other objects and advantages of the present invention will become apparent to those skilled in the art by recourse to the following specification, drawings and claims.

The present invention is an improvement upon the inventions disclosed in applicant's prior U.S. Pat. No. 3,589,496 and applicant's co-pending applications Ser. Nos. 893,671 and 889,485.

BRIEF DESCRIPTION OF THE DRAWINGS

The novelty of the present invention resides primarily in the mechanism of the area of an accumulation conveyor which brings about the accumulation function and since this area is duplicated at intervals along the length of the conveyor, the drawings have been limited to just one of these mechanisms and details of conventional accumulation conveyor construction have been eliminated wherever not needed in order to more clearly disclose the present invention.

DESCRIPTION OF THE PREFERRED EMBODIMENTS OF THE PRESENT INVENTION

Figure 1:
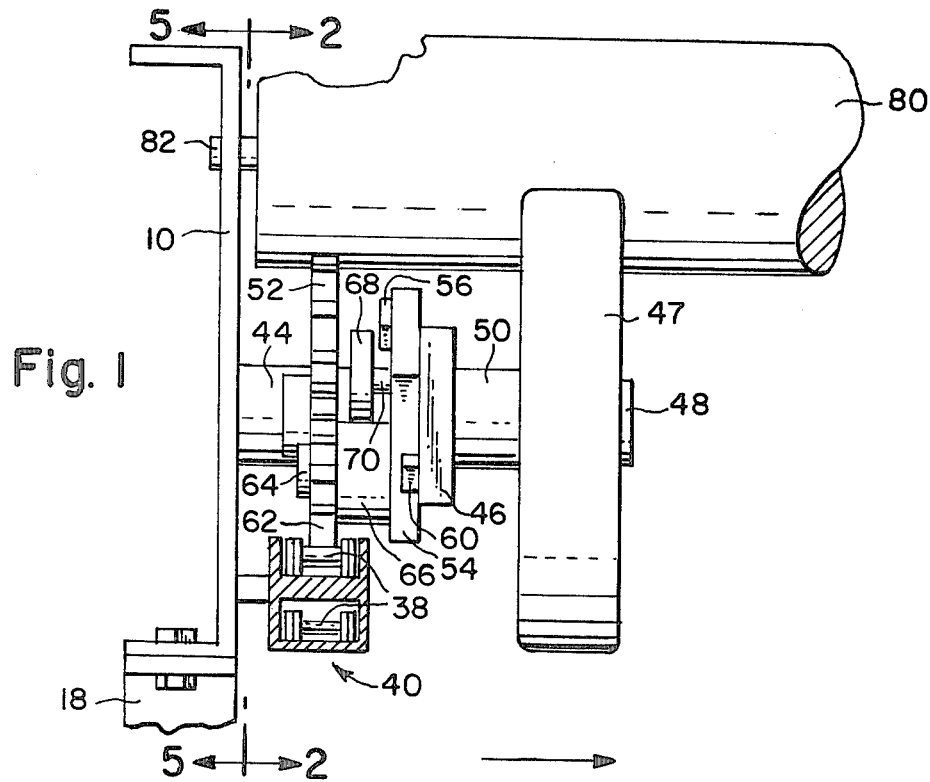
FIG. 1 is a end view of the accumulation mechanism of the present invention.

The frame of the accumulation conveyor of the present invention is essentially the same as that shown in Applicant's prior U.S. Pat. No. 3,589,496 and comprises side rails 10 and legs 18 and provided with article supporting and moving units preferably in the form of rollers 80 suitably mounted for free rotation on shafts 82 supported by the side rails 10 and which form an article path.

At a distance below the rollers 80 a powered driving element for the rollers 80 is positioned and which can be a band, belt, cable, chain or any equivalent thing which will accomplish the desired function. A chain is preferred in this application of the invention.

The chain 38, both top and bottom runs, is carried by guide runs 40 in the same manner as disclosed in U.S. Application Ser. No. 893,671. The chain 38 is suitably driven by any desired prime mover such as a conventional motor-gear reducer drive which has not been shown to conserve space.

At any desired intervals along the conveyor frame accumulating mechanisms made in accordance with the present invention are positioned. Each of these mechanisms comprises a stud shaft 42 suitably attached to a frame side rail 10 as, for example, by butt welding. A sleeve 44 surrounds the shaft 42 and is rotatable thereon, and is suitably connected at its outer end to an arm 46.

A shaft 48 is journaled for rotation in a tube 50 which is suitably attached to the arm 46 as by welding or a force fit. A sprocket 52 is carried on one end of the shaft 48 and a friction drive wheel 47 is carried on the other end of shaft 48. Both the sprocket and drive wheel rotate with the shaft.

A swingable arm 54 is mounted for rotation on a shoulder bolt 56 which is tightly threaded into the arm 46 leaving sufficient space between the bolt head and arm 46 for the arm 54 to swing free. The arm 54 swing area is limited by stops 58 and 60 fixed on arm 46.

A sprocket 62 is mounted for rotation on a shoulder bolt 64 which is screwed into the arm 54 leaving sufficient clearance between bolt head and arm 54 to permit free rotation of the sprocket 62. A hub 66 is provided on the side of the sprocket 62 next to arm 54.

A back-up roller 68 is mounted for rotation on a shoulder bolt 70 also screwed into the arm 46.

The components above described form a compact assembly which can be installed originally as well as removed when any replacement is desired merely by sliding the sleeve 44 off of the stud shaft 42. The sleeve 44 is retained on the stud shaft 42 by any desired quick release fastener such as a nut, split ring and groove, through pin, friction clip, etc.

Figure 3:
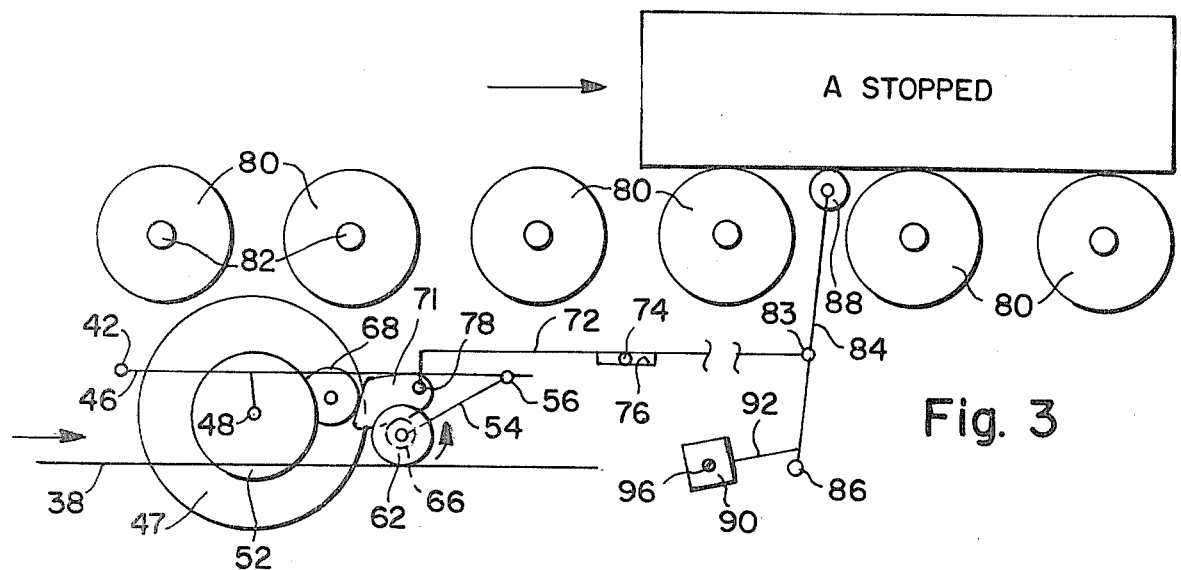
FIG. 3 is a line diagram of the invention mechanism showing this mechanism in position where it is not driving the conveyor roller due to an item being conveyed being stopped on the conveyor at a point where its continuing presence has depressed a sensor roller so as to deactivate the roller driving function of the invention mechanism.
Figure 4:
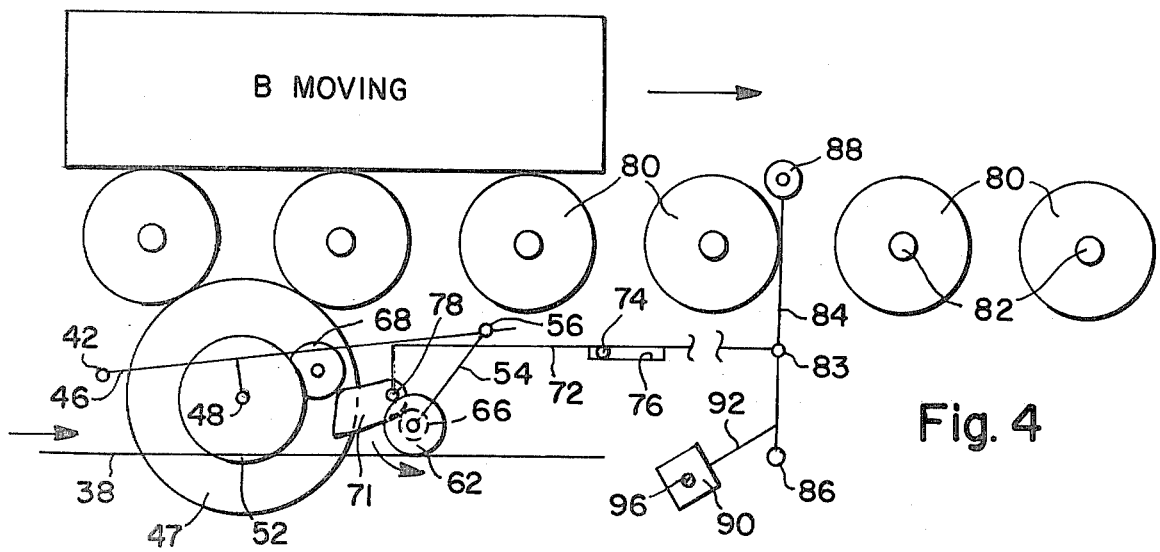
FIG. 4 is a line diagram of the invention mechanism similar to FIG. 3 but in position where the mechanism is driving the conveyor rollers.
Figure 5:
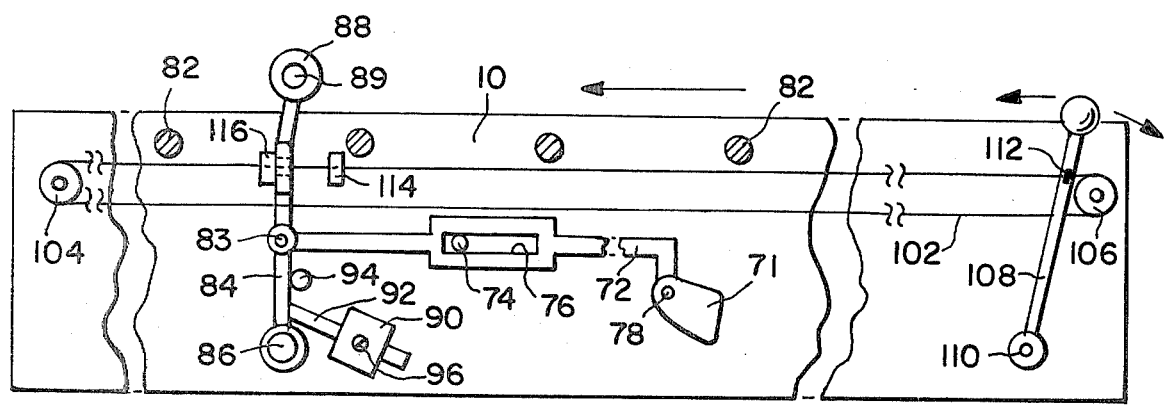
FIG. 5 is a sectional view of the invention mechanism taken substantially in the plane indicated by the line and arrows 5—5, and showing the article sensor and its connecting linkage to the remainder of the invention mechanism. The linkage is in the same position as shown in FIG. 3.

A control element 71 is suspended between the back-up roller 68 and the hub 66 of the sprocket 62 as shown in FIGS. 3, 4 and 5. This element 71 is preferably shaped as shown as that shape gives the most efficient operation of the control member 71 but many other shapes will provide operation.

The control element 71 is pivoted at 78 to a slide bar 72 as shown in FIG. 5. The slide bar 72 is in part supported by a stud 74 suitably fastened to a frame side rail 10 and slidable in a slot 76 formed in the slide bar 72, and in part supported by a pivotal connection 83 to a sensor lever 84 pivoted to the side rail 10 at 86. An article sensor roller 88 is rotatably attached at 89 to the upper end of the lever 84. The opposite end of the sensor roller 88 is rotatably attached to a lever (not shown) pivoted on an opposite frame side rail 10. A biasing weight 90 is supported by an arm 92 rigidly attached to the lever 84 to maintain the sensor roller in position to be contacted by any approaching article. Any other desired biasing facility such as a spring may be used instead of the weight 90. A suitable stop 94 limits clockwise movement of lever 84 or the sensor roller 88 may be permitted to roll against the adjacent article support roller 80.

The sensor roller 88 in most accumulation operations is spaced one average article length ahead of the rollers 80 it controls so that when an article is resting over and depresses a sensor roller 88, the rollers just behind the resting article are deactivated so that any following article will stop when it reaches these deactivated rollers and can not subject the resting article to significant pressure or stopped just before it contacts the resting article. The slide bar 72 is shown with a broken area in FIGS. 3, 4 and 5 to indicate that it can be of any desired length. The operation of the accumulation conveyor of the present invention is as follows: When an article A is stopped for any reason it depresses the sensor roller 88 into the position shown in FIG. 3 which slides the slide bar 72 to the right into the position shown in FIG. 3. This positions the control member 71 above the sprocket 62 hub 66 where it rests lightly on the hub 66 because it is very light. Control member 71 can be made of any desired material but is preferably made of a light, tough plastic such as Nylon, Silicone, polyurethane, etc.

In this position the control member is inactive as is the entire accumulation mechanism. The arm 46 is in a substantially horizontal position which causes the friction drive wheel 47 to be out of contact with any roller 80 so that it merely revolves without exerting any driving force. The sprocket 52 is moved by the chain 38 as is the sprocket 62 but these moving parts are merely idling.

When the article A moves ahead, which is usually caused by the article directly ahead of A moving ahead or being bodily removed from the conveyor, the sensor roller 88 moves upwardly and to the left into the position shown in FIG. 4, under the light force provided by biasing weight 90 the slide bar 72 is moved by the lever 84 to the left which moves the control member 71 to the left into contact with the back-up roller 68 which directs the control member 71 downwardly into light contact with both the back-up roller 68 and the hub 66 which is being driven by the sprocket 62 and chain 38 in the direction shown by the arrow in FIG. 4 so that the hub 66 due to even the light contact with the control member 71 forces the control member 71 down into the relatively narrow space between the back-up wheel 68 and the hub 66 which creates a light braking action on the sprocket 62 which increases the very light force of the teeth of sprocket against the moving chain 38. When the sprocket 62 was under no load and just idling the chain 38 exerted just enough force on the teeth of sprocket 62 to rotate the sprocket because that was all of the resistance to movement of the chain 38 that the sprocket 62 was at that time capable of offering. There was, therefore, no force present to cause the sprocket 62 to move laterally with the chain 38 so as to rotate the arm 54 counterclockwise. However, when the control member 71 exerted even a light braking force against the hub 66 of the sprocket 62 the resistance which the teeth of sprocket 62 offered to the movement of chain 38 increased enough so that the sprocket 62 started to move with the chain 38 and started rotation of arm 54 counterclockwise which in turn caused the arm 54 to rotate counterclockwise which moved the friction drive wheel 47 upwardly and into contact with two rollers 80 so as to rotate them and thus moved article B along the conveyor.

When the friction drive wheel 47 contacted the rollers 80 further rotation of arm 46 was stopped which caused the sprocket 62 and its hub 66 to tend to stop rotating which increased the pressure of the teeth of sprocket 62 against the chain 38 so that the chain 38 exerted more force in the direction it was moving against the sprocket 62 and thereby increased the force against the sprocket 62 in a lateral direction which caused the arm 54 to exert more force against the arm 46 to move further upwardly and thereby increased the driving force of the friction drive wheel 47 against the rollers 80 and enabled them to exert more moving force against the conveyed articles.

It can thus be seen that unlimited driving force, within the load capacity of the rollers 80, can be imparted to the rollers 80 by merely shaping the control member 71 to increase its wedging action between back-up roller 68 and the hub 66 of sprocket 62 as it enters there in between so as to provide the required braking action on hub 66 to exert the required resistance to rotation of sprocket 62 to enable the chain 38 to exert the required lateral moving force against the sprocket 62 to create the desired ultimate driving power for the rollers 80. This ultimate driving power for the rollers 80 is practically unlimited because the power of the drive for chain 38 can be increased to any amount desired by selection in conventional manner of an adequate prime mover for the conveyor drive.

It can also be seen that the very light force required to start the insertion of the control member 71 in between the back-up roller 68 and the hub 66 of sprocket 62 is multiplied many times by using the nearly unlimited power of the chain 38 to provide the force to press the friction wheel 47 against the rollers 80. Thus a very light article on the conveyor can depress sensitive sensor roller 88 and release the much larger force required for the rollers 80 to drive very heavy articles when such are on the same conveyor with very light articles without resorting to force generating sources extraneous to the conveyor.

It will be noted that the back-up wheel 68 is positioned on the arm 46 so that movement of the control member 71 under the driving force of the hub 66 will also exert an upward force on the arm 46 to rotate it counterclockwise.

When the moving article article B passes onto sensor roller 88 this roller will be depressed and the lever 84 will be moved clockwise which will move the slide bar 72 to the right which will retract the control member 71 from in between the back-up roller 68 and the hub 66 and into the position shown by FIG. 3. This required very little force to be exerted against the sensor roller 88 because the control member 71 retracts very easily from between the back-up roller 68 and the hub 66 because when the arm 54 is in the position shown in FIG. 4 the hub 66 has a very light and, at times, even no contact with the control member 71. This is due to the fact that the force which moves arm 54 and hub 66 clockwise is created by the weight of arm 46 and the other elements which it supports. The more arm 54 is rotated counterclockwise by the force of chain 38 the less effect the weight of arm 46, etc. has in producing a clockwise rotating force on the arm 54 until the arm 54 becomes vertical at which point the rotating effect of this weight becomes zero because its weight is all carried directly by the arm 54. To prevent this condition the stop is positioned so as to stop the counterclockwise rotation of arm 54 just before it reaches a vertical position. This has the effect of always creating a very light clockwise rotation force on arm 46 so as to return it to the position shown in FIG. 3 when the control member is withdrawn from between the hub 66 and the back-up roller 68. This force is so light that it vasilates between a very light force and zero force which makes it possible for control member 71 to be so withdrawn with a very light lifting force.

Thus it can be seen that the force required to operate the accumulation mechanism of the present invention both into and out of operating position is very small. The chain 38 providing almost all of the force required to move this accumulation mechanism into position and the weight of arm 46, etc. providing all of the force required to move it out of operating position. This makes it possible for a very minor force to be exerted against the sensor roller 88 to move it which enables the smallest article which will run on the conveyor to operate it satisfactorily along with much larger articles.

Operating conditions in industrial operations frequently require that accumulation functions be discontinued for a period, such as when it is desired to move all of the cases off of a storage conveyor and into a case pallatizer (termed a "slug-out" in the industry), and to convert an accumulation conveyor into a simple roller conveyor when it is desired to move cases ahead or backwards by hand for examination or any other reason. A mechanism is shown in FIG. 5 which enables these operations to be performed. It comprises an endless cable 102 carried between two sheaves 104 and 106 and attached at 112 on the upper run to a manual control handle 108 pivoted to a side rail 10 at 110. This cable 102 is continuous and extends the full length of the conveyor and thus passes by each sensor bar 84 on the conveyor. Two stops 114 and 116 are suitably fastened to the cable 102 at positions such that when the handle 108 is moved clockwise into the position shown in FIG. 5 the sensor roller 88 and lever 84 will hold the accumulation mechanism in the position shown in FIG. 3 because the stop 116 has contacted lever 84 and both moved it into that position and will hold it there until the control handle 108 is moved counterclockwise to release the stop 116 and lever 84. When in this FIGS. 3 and 5 position the rollers 80 are free of any driving force from the friction wheel 47 and can freely rotate in either direction, so that the article supported thereby can be hand or otherwise pushed in either direction. When the control handle is rotated in a counterclockwise direction the stop 114 will contact and move the lever 84 into the position shown in FIG. 4 and hold it there until the control handle 108 is moved clockwise and during the period that lever 84 is so held the articles on the conveyor will roll over the sensor rollers 88 and not move lever 84 and continue the full length of the conveyor without stopping so as to rapidly satisfy a demand for many caes quickly("slug-out").

Figure 2:
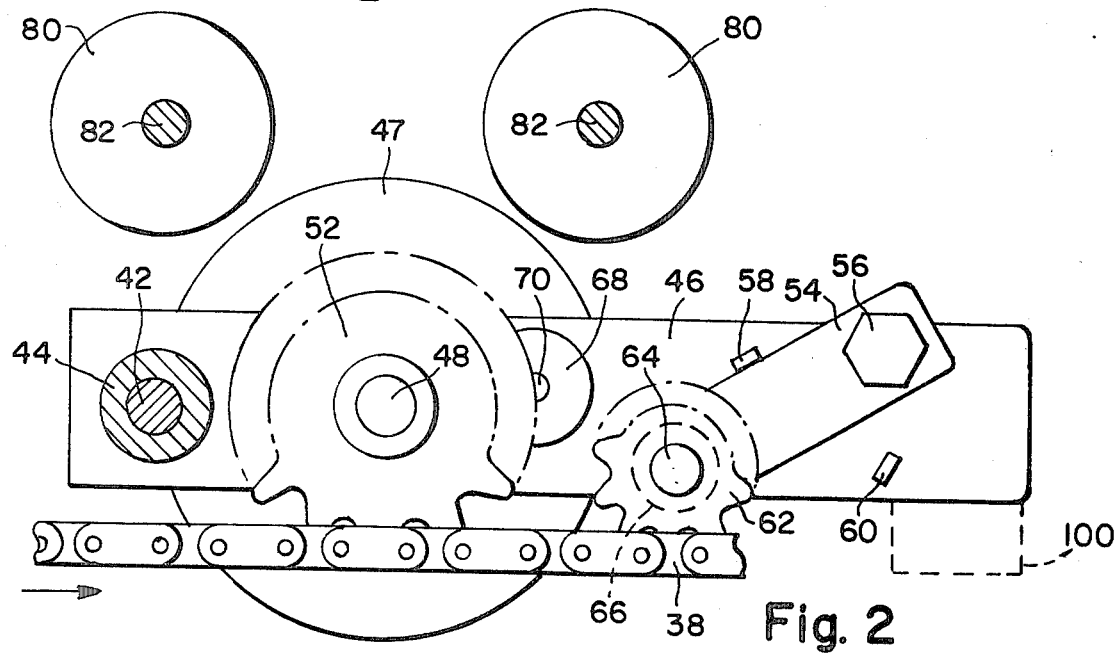
FIG. 2 is a sectional view of this invention mechanism taken substantially in tne plane indicated by the line and arrows 2—2, and looking in the direction of the arrows 2—2.

When the control handle 108 is in verticle or midposition the accumulation runs on continuously without interruption. If it should be desired to cause the arm 46 and the components it supports to move downwardly very rapidly a weight can be suitably attached, as by bolting, to the free or right end of arm 46 as shown at 100 in FIG. 2.

The friction wheel 47, shaft 48, shaft bearing 50 and the sprocket 52 form a motion transmission assembly which transmits motion from the chain 38 to the rollers 80.

When the sprocket 52 is moved upwardly to cause the friction wheel 47 to contact and rotate the rollers 80, the sprocket teeth move slightly out of the chain 38 but do not break driving connection with the chain 38 nor does this slight movement interfere with the efficient mechanical motion transfer between the chain 38 and sprocket 52. If desired, the teeth of sprocket 52 can be made slightly longer than usual but not long enough to cause interference at the time of entry and release of the teeth from the chain 38.

When desired, the brake blocks disclosed in co-pending application Ser. No. 893,671, filed Apr. 5, 1978 can be attached to the arm 46 to stop the rollers 80 when an article is stopped on the conveyor.

Thus it can be seen that the present invention provides an accumulation conveyor which is not complicated in construction, positive in operation, requires no adjustments during use, economical to produce, has a full range of operations required in accumulation application, can efficiently handle articles of greatly varied size and weight, can operate at high speeds, requires very little maintenance as there are no belts to require adjustments, etc., and requires no air compressor, valves, piping, filters etc., and no electrical equipment other than the main drive motor which also supplies the power required to operate the starting and stopping mechanism, or any other extraneous power source.

PRIOR ART

The closest prior art of which applicant is aware is as follows: U.S. Pat. No. 4,108,303 discloses a friction wheel and a sprocket moved upwardly until the friction wheel contacts and rotates an article carrying roller but here the chain does not remain in a horizontal position but must move upwardly along with the sprocket which it drives. This requires that the drive chain be operated in a very loose condition in order for the large number of sprockets on a system to be able to all move up together which does happen frequently during accumulation operations. Also, considerable power is required to so deflect a moving chain. So much so that this device requires special air cylinders or pads to raise the friction wheels into contact with the carrying rollers which also requires an air compressor, valves, tubing, air filters, etc.. It does not use power taken from the chain.

U.S. Pat. No. 3,116,823 discloses a driven belt which is positioned so that when it is moved upwardly it either contacts the conveyed articles directly when used on a skate wheel type conveyor or contacts article supporting rollers when used on a roller type conveyor. The belt has teeth along the underside of it which are engaged by a sprocket mounted for rotary and limited linear movement along the belt.

At desired times a linkage mechanism actuated by contact with conveyed articles moves a ratchet into contact with the teeth of the sprocket which locks the sprocket from rotation which causes the sprocket, ratchet and their supporting medium to move the sprocket with the belt linearly for a short distance when a trip member disengages the sprocket and allows it to rot again and discontinue linear movement. The short linear movement through linkage raises a roller upwardly against the belt so that the belt contacts either an article or an article supporting roller and thus moves the article along the conveyor.

In the course of this sprocket movement its teeth sink into tighter mesh with the belt teeth. This change in tooth position is just the natural result of the arcuate movement of the sprocket and is not utilized to enable any other members to move, contact or produce any useful result such as enabling a friction wheel to move into contact with an article supporting roller as in the present invention.

Furthermore, this device could not possibly operate at the high conveyor speeds used today because the ratchet could not possibly be moved into and out of contact with the sprocket in the fraction of a second available for this two way movement of the ratchet. The ratchet and sprocket will invariably jam together and rip teeth out of the belt. The operation of this invention is not in any way affected by the speed of the conveyor.

It is obvious that the mechanism of the present invention can be utilized in connection with different types of conveyors such as skate wheel, roller, air support, etc.

The foregoing is to be construed as descriptive and not limitative as many changes and modification can be made in the described mechanism without departing from the scope of the basic invention.

The invention having been described, what is claimed is:

1. An article accumulation conveyor having a frame, an endless driven member supported thereby, an arm pivoted relative to said frame and movable from a lowered position to a raised position, a second arm pivoted at a given point on said first named arm and extending from said given pivot point towards said endless driven member at an angle of less than ninety degrees to said endless driven member when said first named arm is in the lowered position, a rotatable member carried on said second named arm near its free end and contacting said endless driven member and rotated thereby, means movable into position to contact and retard rotation of said rotatable member which causes it to move with said endless driven member and move said second named pivoted arm towards a ninety degree angle with said endless driven member which moves said first named pivoted arm to raised position, and sensor means actuated by contact by a conveyed article to move said movable means into rotation retardation contact with said rotatable member.

2. An article accumulation conveyor comprising a frame supporting a rotatable unit type article supporting path, a driven elongated member extending along but spaced from said path, means for transmitting movement from said driven elongated member to said path to move said articles comprising an arm mounted for up and down movement relative to said frame, an assembly carried by said arm having a first rotatable part in contact with said driven member and rotated thereby and a second part connected for rotation with said first part which in the up position of said arm extends into said path to move said articles, means for moving said arm upwardly comprising a second arm pivoted at a given point on said first arm and extending from said given pivot point towards said driven member at a less than right angle thereto, a rotatable member carried near the free end of said second arm and in rolling contact with said driven member and rotated thereby, a member mounted for movement into position to contact and retard rotation of said last named rotatable member to thereby cause said last named rotatable member to move laterally with said driven member to rotate said second arm into a position to raise said first arm to move said second part of said assembly into said article supporting path to move said articles, and sensor means operated by contact with a conveyed article to move said last named member into position to retard rotation of said rotatable member carried by said second arm.

3. An article accumulation conveyor comprising a frame, rotatable article support units carried by said frame and positioned so as to form an article travel path, a driven elongated member mounted for movement lengthwise along but vertically spaced from and below said article support units, a frame carried support under said driven member maintaining it always at a substantially fixed elevation, means for transmitting movement from said driven member to said article support units to rotate the same so as to move the articles comprising at least one movement transmission assembly pivoted for vertical movement on and rotatably mounted relative to said frame for movement into two extreme vertical positions relative to said driven member and comprising a rotatable member, a first part of which contacts said driven member and is rotated thereby (in the extreme lowered position) and a second part of which is attached for rotation with said first part and contacts (at least one) in between two of said article support units when in the extreme raised position to rotate the same and move said article without breaking the driving contact between said first member and said driven member, said first part which contacts said driven member and the driven member itself having coacting interlocking areas which enable significant vertical separation movement between them without breaking driving contact therebetween, means powered solely by said driven elongated member and which exerts a definite and well defined vertical thrust of unlimited duration, except for space limitations, upwardly for moving said movement transmitting means vertically from the lower extreme position to the upper extreme position to force said second part in between two of said rotatable article supports to rotate them, and means operated by articles when in certain positions on said rotatable article supports for controlling the vertical movement functions of said last named means but without exerting any of the force to create the vertical movements so that a very light article can accurately control the vertical movements.

4. An article accumulation conveyor a specified in claim 3 further characterized by a second member in contact with said driven member and mounted to be rotated thereby and moved a limited distance therealong, the mounting for said second member including a linkage with said transmission assembly which limits the length of said movement of said second member along said driven member and simultaneously raises said transmission assembly to bring said second part thereof into driving contact with said at least one of said article support units to rotate the same and move articles along said path, control means for initiating said movement of said second member along said driven member, and sensor means actuated by said articles and connected with said control means for activating the same.

5. An article accumulation conveyor comprising a frame, rotatable article support and moving units carried by said frame and positioned so as to form an article travel path, a driven elongated member movable lengthwise along said rotatable article support unit path, activatable means for transmitting movement from said driven member to (articles on said path) said rotatable article support units, sensor means operated by articles at selected points on said path and connected with said movement transmission means so as to activate and deactivate said movement transmission means when articles are in given positions on said path whereby the conveyor is enabled to perform an article accumulation function and means normally inoperative but operable at will by an operator to lock said sensor means in either the movement transmission means activated or deactivated position whereby the conveyor is also enabled to selectively perform the function of a constantly powered roller conveyor or unpowered roller conveyor.

6. An article accumulation combeyor as specified in claim 1 in which said driven member is a chain.

7. An article accumulation conveyor as specified in claim 1 in which said rotatable member is a sprocket.

8. An article accumulation conveyor as specified in claim 2 in which said first rotatable part is a sprocket and said driven member is a chain.

9. An article accumulation conveyor as specified in claim 2 in which said second part is a friction wheel.

10. An article accumulation conveyor as specified in claim 5 further characterized in that said sensor lock means comprises a sheave suitably rotatably supported at each end of the conveyor, an endless flexible member carried on and between said sheaves and loosely attached to each of said sensor means, a stop carried by said flexible member on each side of and spaced slightly away from said sensor means, a control arm rigidly attached to one of said sheaves and positioned so that when said control arm is moved from an inoperative position to one side the flexible member will be moved linearly so that the stops on one side of said sensor means will move said movement transmission means into the movement transmission function position and lock it there, and when said control arm is moved in the opposite direction from the inoperative position the flexible member will be moved linearly so that the stops on the opposite sides of the sensor means will move said movement transmission means into the the movement transmission non-function position and lock it there.

* * * * *

UNITED STATES PATENT AND TRADEMARK OFFICE
CERTIFICATE OF CORRECTION

PATENT NO. : 4,212,385

DATED : July 15, 1980

INVENTOR(S) : John Meredith Leach

It is certified that error appears in the above—identified patent and that said Letters Patent is hereby corrected as shown below:

Claim 3, column 8, lines 60 and 61, delete "(in the extreme lowered position)".

Claim 3, column 8, lines 62 and 63, delete "(at least one)".

Claim 5, column 9, line 38, delete "(articles on said path)".

Signed and Sealed this

Twenty-eighth Day of October 1980

[SEAL]

Attest:

SIDNEY A. DIAMOND

Attesting Officer

Commissioner of Patents and Trademarks